(12) United States Patent
Eiermann et al.

(10) Patent No.: US 9,857,495 B2
(45) Date of Patent: Jan. 2, 2018

(54) APPARATUS FOR CHECKING FOR A PRESENCE OF AN ELECTRICALLY CONDUCTIVE BODY, AND CHARGING SYSTEM

(71) Applicant: SIEMENS AKTIENGESELLSCHAFT, Munich (DE)

(72) Inventors: Franz Eiermann, Rattelsdorf-Ebing (DE); Andreas Fackelmeier, Thalmaessing (DE); Klaus Huber, Effeltrich (DE); Sebastian Martius, Forchheim (DE); Ralph Oppelt, Uttenreuth (DE); Claus Seisenberger, Neufrannhofen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/686,817

(22) Filed: Apr. 15, 2015

(65) Prior Publication Data
US 2015/0293253 A1    Oct. 15, 2015

(30) Foreign Application Priority Data
Apr. 15, 2014    (DE) .................. 10 2014 207 253

(51) Int. Cl.
| | | |
|---|---|---|
| B60L 11/18 | (2006.01) | |
| H02J 7/02 | (2016.01) | |
| H02J 50/10 | (2016.01) | |
| G01V 3/10 | (2006.01) | |

(52) U.S. Cl.
CPC .............. *G01V 3/10* (2013.01); *B60L 11/182* (2013.01); *H02J 7/025* (2013.01); *H02J 50/10* (2016.02)

(58) Field of Classification Search
CPC ................................ G01V 3/108; G01V 3/165
See application file for complete search history.

(56) References Cited

U.S. PATENT DOCUMENTS

| 5,245,307 A | 9/1993 | Klaus et al. |
|---|---|---|
| 5,459,451 A | 10/1995 | Crossfield et al. |
| 6,541,965 B1 | 4/2003 | Binder et al. |

(Continued)

FOREIGN PATENT DOCUMENTS

| DE | 3912840 A1 | 10/1990 |
|---|---|---|
| DE | 4333225 A1 | 4/1995 |

(Continued)

*Primary Examiner* — Clayton E Laballe
*Assistant Examiner* — Noam Reisner
(74) *Attorney, Agent, or Firm* — Laurence A. Greenberg; Werner H. Stemer; Ralph E. Locher

(57) ABSTRACT

An apparatus for checking for a presence of an electrically conductive body has at least one transmitting device and at least one receiving device. The transmitting device provides a transmission signal in the form of a magnetic field. The receiving device generates a reception signal from the transmission signal that is induced into the receiving device. The transmitting and receiving devices are configured in such a way that, when the electrically conductive body is absent, partial reception signals form in the receiving device on account of the induced transmission signal and the partial reception signals substantially cancel one another out in the reception signal.

8 Claims, 3 Drawing Sheets

(56) References Cited

U.S. PATENT DOCUMENTS

| | | | | |
|---|---|---|---|---|
| 6,853,194 | B2 * | 2/2005 | Nelson | G01V 3/104 |
| | | | | 324/329 |
| 9,281,708 | B2 | 3/2016 | Wechlin et al. | |
| 2012/0007591 | A1 * | 1/2012 | Howard | G01B 7/003 |
| | | | | 324/207.15 |
| 2014/0070764 | A1 * | 3/2014 | Keeling | B60L 11/1833 |
| | | | | 320/108 |
| 2015/0015086 | A1 | 1/2015 | Krammer et al. | |
| 2015/0015199 | A1 * | 1/2015 | Krammer | B60L 11/182 |
| | | | | 320/108 |
| 2015/0115728 | A1 * | 4/2015 | Yamamoto | H02J 5/005 |
| | | | | 307/104 |
| 2015/0276965 | A1 * | 10/2015 | Turki | B60L 11/182 |
| | | | | 324/207.17 |

FOREIGN PATENT DOCUMENTS

| | | | |
|---|---|---|---|
| DE | 4423661 | A1 | 1/1996 |
| DE | 69421204 | T2 | 4/2000 |
| DE | 60106215 | T2 | 4/2005 |
| DE | 69935792 | T2 | 8/2007 |
| DE | 102009033237 | A1 | 1/2011 |
| DE | 102012205283 | A1 | 10/2013 |
| DE | 102012205285 | A1 | 10/2013 |
| DE | 102013219131 | A1 | 3/2015 |
| WO | 2013189530 | A1 | 12/2013 |

* cited by examiner

APPARATUS FOR CHECKING FOR A PRESENCE OF AN ELECTRICALLY CONDUCTIVE BODY, AND CHARGING SYSTEM

CROSS-REFERENCE TO RELATED APPLICATION

This application claims the priority, under 35 U.S.C. §119, of German patent application DE 10 2014 207 253.0, filed Apr. 15, 2014; the prior application is herewith incorporated by reference in its entirety.

BACKGROUND OF THE INVENTION

Field of the Invention

The present invention relates to an apparatus for checking for the presence of an electrically conductive body, comprising at least one transmitting device for providing a transmission signal in the form of a magnetic field. Furthermore, the present invention relates to a charging arrangement for inductively charging an electric vehicle comprising such an apparatus.

In the case of inductive charging arrangements for electric vehicles, primary coils and secondary coils are usually used for transferring the electrical energy. When charging the battery of the electric vehicle, it is necessary to prevent electrically conductive bodies from being able to reach the large air gap between the primary coil and the secondary coil. The electrically conductive body can be heated on account of the action of the charging field in the air gap. In the worst case, for example for metal-coated plastics or for metal-coated papers, a self-ignition of the body can occur.

In order to be able to check for the presence of an electrically conductive body in the interspace between the primary coil and the secondary coil, metal detectors are used, for example. Metal detectors are based on various, usually inductive, measurement principles. However, use of such metal detectors specifically for air gap monitoring requires a specifically adapted procedure, since it is necessary to prevent the large metal mass of the vehicle from disturbing the measurement process. Moreover, a calibration of the detector before the measurement, as is usual in conventional metal detectors, cannot be implemented in a straightforward way.

SUMMARY OF THE INVENTION

It is accordingly an object of the invention to provide a method and an apparatus for determining whether an electrically conductive body is present which overcomes the above-mentioned and other disadvantages of the heretofore-known devices and methods of this general type and which provides a solution as to how electrically conductive bodies, particularly in a charging arrangement for electric vehicles, can be identified more simply and more reliably.

With the foregoing and other objects in view there is provided, in accordance with the invention, an apparatus for checking for the presence of an electrically conductive body, the apparatus comprising:

at least one transmitting device for generating a transmission signal in the form of a magnetic field;

at least one receiving device for generating a reception signal from the transmission signal induced into said receiving device;

said transmitting device and said receiving device being configured such that, when the electrically conductive body is present, a first reception signal is formed in said reception device on account of the induced transmission signal and, when the electrically conductive body is absent, a second reception signal is formed that is different from the first reception signal.

In other words, the objects are achieved with an apparatus according to the invention for checking a presence of an electrically conductive body, comprising at least one transmitting device for providing a transmission signal in the form of a magnetic field, is distinguished by the fact that the apparatus comprises at least one receiving device for generating a reception signal from the transmission signal provided by the transmitting device and induced into the receiving device and the transmitting device and the receiving device are formed in such a way that, when the electrically conductive body is present, a first reception signal forms and, when the electrically conductive body is absent, a second reception signal, different than the first, forms in the receiving device on account of the induced transmission signal.

The apparatus can be used to check for the presence of an electrically conductive body in a predetermined ambient region of the apparatus. The apparatus can also be designed to detect a body which is formed at least partly from an electrically conductive material. In particular, the apparatus can be used to check whether an electrically conductive body is situated in an interspace between a primary coil and a secondary coil of a charging arrangement for electric vehicles. The apparatus comprises a transmitting device, which can emit a transmission signal in the form of a magnetic field. Furthermore, the apparatus comprises a receiving device, which can receive the transmission signal or parts thereof. In particular, the reception signal can be influenced by the electrically conductive body. This influencing or alteration of the magnetic field can be detected by the receiving device. Consequently, the presence of an electrically conductive body in the ambient region of the receiving device can be deduced on the basis of the first signal and/or the second signal.

Preferably, the transmitting device and the receiving device are formed in such a way that, when the electrically conductive body is absent, partial reception signals form in the receiving device on account of the induced transmission signal, which partial reception signals substantially cancel one another out in the reception signal. In the present case, the transmitting device and the receiving device can be formed in such a way that no reception signal is detected by the receiving device if the electrically conductive body is not situated in an ambient region of the apparatus.

The receiving device can be formed in such a way that partial reception signals are generated in the receiving device on account of the magnetic field which is generated by the transmitting device. In this case, the receiving device is preferably formed in such a way that these reception signals mutually cancel one another out. The receiving device can also be formed in such a way that a reception signal which is below a predetermined threshold value is formed by the superimposition of the partial reception signals. It is also possible, of course, to form a difference with respect to the reception signal which prevails if no conductive body is situated in the surroundings of the apparatus.

The transmitting device and the receiving device can be formed in each case as coils. In this regard, it is possible to provide an apparatus which uses two or more magnetically decoupled coils. In the case free of disturbance bodies, the coils are arranged with respect to one another in such a way that precisely no reception signal can be measured. If the electrically conductive body or the metallic disturbance body is introduced in the reception region of the receiving device, the partial reception signals can be formed in such a way that they do not cancel one another out in the reception signal or the reception signal exceeds the threshold value. In this way, an electrically conductive disturbance body can be detected simply and reliably.

In one configuration, the receiving device comprises a predetermined number of receiving coils arranged with respect to the transmitting device in such a way that the transmission signal is induced into the respective receiving coils substantially in identical portions. The receiving device can comprise two or more receiving coils, into each of which the transmission signal in the form of the magnetic field can be coupled. The receiving device can also comprise an even number of receiving coils. In particular, an electrical voltage can be induced into each of the receiving coils. In this case, the receiving coils can be formed in such a way that, when the electrically conductive body is absent, the induced voltages cancel out relative to one another.

Preferably, the receiving coils are arranged alongside one another in a main extension direction of the receiving device. The individual receiving coils can be formed for example by respective conductor loops. It is thus possible to provide a receiving device which can be produced simply and cost-effectively.

In a further embodiment, the transmitting device comprises a predetermined number of transmitting coils arranged alongside one another in a main extension direction of the transmitting device. The transmitting device, too, can be provided by conductor loops arranged alongside one another. In this case, it is also conceivable for the receiving coils of the receiving device and the transmitting coils of the transmitting device to be formed structurally identically. The transmitting device can also comprise an even number of transmitting coils. It is thus possible to provide a cost-effective apparatus for checking a presence of a metallic foreign body.

In one embodiment, the receiving device has a crossover point between two receiving coils arranged alongside one another and the receiving device is arranged with respect to the transmitting device such that the crossover point is positioned centrally with respect to one of the receiving coils. The receiving device can comprise a plurality of receiving coils which are formed by respective conductor loops, for example. Between the respective receiving coils, the electrical conductors can be arranged with respect to one another in such a way that they cross one another. In the present case, the receiving coils can be arranged with respect to the transmitting coils such that the crossover point of the receiving coils is arranged centrally with respect to the transmitting coil. What can thus be achieved is that the electric field of the transmitting device is transferred uniformly to two receiving coils.

Preferably, the transmitting device is formed in such a way that respectively adjacent receiving coils provide oppositely directed magnetic fields. This makes it possible to prevent adjacent transmitting coils from mutually influencing one another by means of their generated magnetic field.

In a further configuration, the transmitting device and the receiving device in each case have a form of a conductor loop twisted at least once. A transmitting device and respectively a receiving device comprising two transmitting coils and comprising two receiving coils, respectively, can be provided by a conductor loop being twisted once. A transmitting device and respectively a receiving device comprising a plurality of transmitting coils and receiving coils, respectively, can be provided by a conductor loop being twisted a number of times, that is to say at different positions. A transmitting device and respectively a receiving device can thus be provided simply and cost-effectively.

In a further embodiment, the transmitting coils and the receiving coils are applied to a carrier by means of a photolithography method. By way of example, the transmitting coils and the receiving coils can be formed from an electrically conductive material, in particular a metal. These can be applied to a circuit board, for example. A corresponding printing method can also be used as an alternative to the photolithography method.

Preferably, the transmitting coils and the receiving coils in each case have partial regions which are arranged on a top side of the carrier and partial regions which are arranged on an underside of the carrier element. Corresponding plated-through holes can be provided between the partial regions of the transmitting coils and respectively of the receiving coils which are arranged on the top side of the carrier element and those partial regions which are arranged on the underside. It is thus possible to provide a space-saving arrangement of the transmitting coils and receiving coils without short circuits.

Preferably, the apparatus comprises a plurality of transmitting devices and a plurality of receiving devices arranged with respect to one another such that the main extension directions of the transmitting devices are perpendicular to the main extension directions of the receiving devices. It is thus possible to provide an array of transmitting coils and receiving coils. By correspondingly reading the receiving coils, it is thus possible to accurately detect the position of the electrically conductive body relative to the individual receiving coils.

It is particularly advantageous if the apparatus comprises an odd number of transmitting devices and an odd number of receiving devices. Basically, the number of transmitting devices and the number of receiving devices are freely selectable. However, if in each case an odd number of transmitting devices and receiving devices is selected, then the printed circuit board or the sensor circuit board can be constructed with two-fold axial symmetry. This has an advantageous effect because e.g. the voltage induced by the strong charging field (typically at 85 kHz) in the transmitting and/or receiving coils becomes zero for reasons of symmetry if the axes of symmetry of the metal detector circuit board and the charging coil system are brought to congruence.

Preferably, the apparatus comprises a control device, by which the transmitting devices are drivable sequentially for respectively providing the transmission signal. In this way, the individual transmitting devices can be activated in order. By reading all the receiving devices, it is thus possible to accurately determine the position of a metallic disturbance body.

The charging arrangement according to the invention for charging an electric vehicle comprises the apparatus according to the invention. The apparatus is arranged in particular in an interspace between a primary coil and a vehicle-side secondary coil. The apparatus can reliably detect whether a metallic foreign body is situated in the air gap between the primary coil and the secondary coil.

Other features which are considered as characteristic for the invention are set forth in the appended claims.

Although the invention is illustrated and described herein as embodied in an apparatus and method for checking a presence of an electrically conductive body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
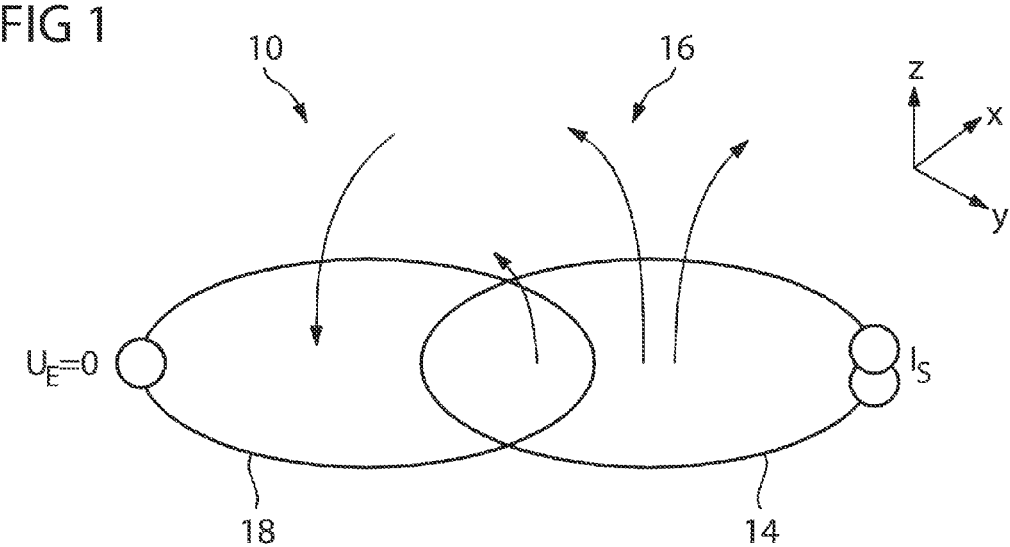
FIG. 1 shows a schematic illustration of an apparatus for checking for the presence of an electrically conductive body.
Figure 2:
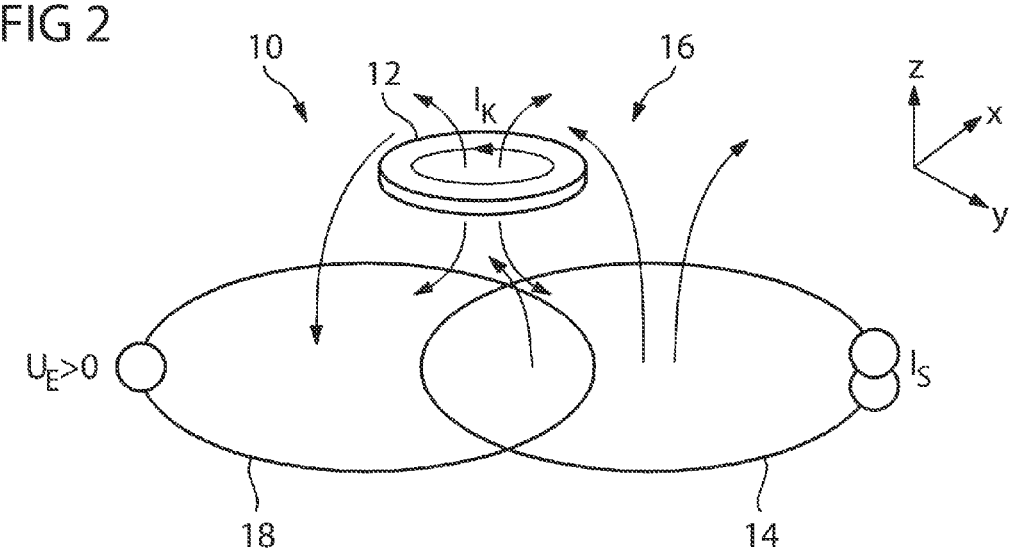
FIG. 2 shows the apparatus in accordance with FIG. 1 into which the electrically conductive body has been introduced.

Referring now to the figures of the drawing in detail and first, particularly, to FIGS. 1 and 2 thereof, there is shown a schematic illustration of an apparatus 10 for checking for a presence of an electrically conductive body 12. The apparatus 10 comprises a transmitting device 14, which is illustrated as a coil in a simplified manner in the present case. A control current $I_S$ can be impressed from a current source into the coil. A magnetic field forms as a result of the current flow in the conductor loop. The magnetic field serves as transmission signal 16 of the transmitting device 14.

Furthermore, the apparatus 10 comprises a receiving device 18, which is also formed as a coil or conductor loop in the present case. In the illustrated example, the transmitting device 14 and the receiving device 18 are superimposed at least regionally. In the arrangement shown, what can be achieved by means of a suitable superimposition of the two coils is that the reception signal $U_E$ assumes the value zero. It is thus possible to provide two coils which are decoupled from one another and of which one serves as transmitter and the other serves as receiver. For the case where no electrically conductive body is situated in the surroundings of the transmitting device 14 and/or of the receiving device 18, precisely no reception signal $U_E$ is generated at the receiving device.

FIG. 2 shows the apparatus 10 in accordance with FIG. 1 into which the electrically conductive body 12 has been introduced. If the electrically conductive body 12 or a metallic disturbance body has been introduced into the transmission field of one of the coils, then an eddy current $I_K$ is induced into the electrically conductive body 12 and provides for the distortion of the resulting overall signal of the arrangement or of the apparatus 10. Consequently, the resulting overall signal of the arrangement is coupled into the receiving device 18, which in turn results in an induced voltage or a reception signal $U_E$ which is greater than zero. In contrast to resonant methods involving the detection of the change in a resonant frequency or a quality factor of a resonant circuit, the coupling method described here can also be operated in a non-resonant fashion. A significantly improved thermal stability can thus be achieved. The detection region in the z-direction is defined by the dimensions of the transmitting device 14 and/or of the receiving device 18 or the size of the coils.

The apparatus 10 can be used, in particular, to detect the presence of an electrically conductive body 12 in an interspace between a primary coil and a secondary coil of a charging arrangement for an electric vehicle or a hybrid vehicle. By way of example, the apparatus 10 can be integrated into a parking area of the charging arrangement. Furthermore, it is also conceivable for the apparatus 10 to be arranged on the vehicle. The apparatus 10 can prevent metallic articles or disturbance bodies from being situated in the air gap between the primary coil and the secondary coil. If such a disturbance body is present during the charging process, it can heat up. Fires may arise in the worst case.

With the use of only two coils, from the magnitude of the reception signal $U_E$ it is not possible to deduce whether the disturbance was then brought about by a small disturbance body at a small distance or a large disturbance body at a large distance. This makes a delimitation between the detection of a body 12 and the vehicle chassis virtually impossible.

Figure 3:
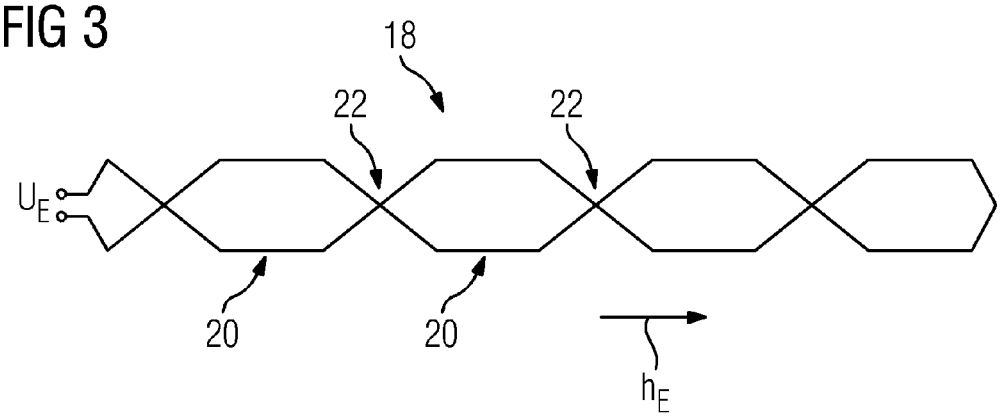
FIG. 3 shows on embodiment of a receiving device of the apparatus.

FIG. 3 shows one embodiment of a receiving device 18 in a schematic illustration. In the present case, the receiving device 18 is formed from a conductor loop. It comprises four receiving coils 20 arranged alongside one another in a main extension direction $h_E$ of the receiving device 18. The receiving device 18 is formed from the conductor loop by virtue of the latter being twisted four times. Consequently, the receiving device 18 has between the receiving coils 20 in each case a crossover point 22 at which the conductor tracks are superimposed but have no electrical connection.

The receiving device 18 illustrated in FIG. 3 therefore comprises four receiving coils 20, which can also be designated as "loops." Moreover, it comprises four structures having the shape of a butterfly. The structures in each case comprise a crossover point 22.

The transmitting device 14 can be formed substantially structurally identically to the receiving device 18. That is to say that the transmitting device 14 can likewise be formed from a conductor loop which is twisted a number of times, such that respective transmitting coils 24 and crossover points 26 arranged between the transmitting coils are formed. In this case, the transmitting coils are arranged alongside one another along the main extension direction $h_S$ of the transmitting device 14.

Figure 4:
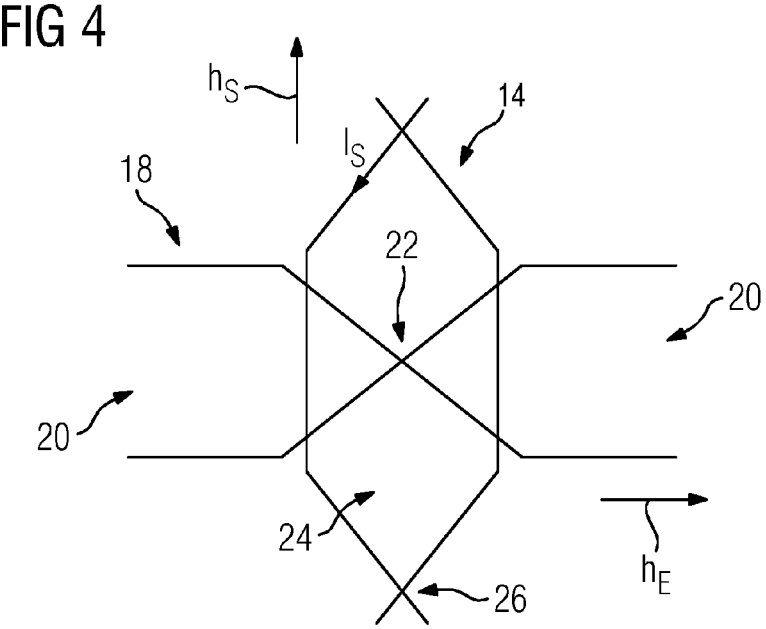
FIG. 4 shows an illustration in the form of an excerpt showing an arrangement of the transmitting device with respect to the receiving device.

FIG. 4 shows in schematic illustration one possible arrangement of the transmitting device 14 with respect to the receiving device 18. In this case, the transmitting device 14 and the receiving device 18 are arranged with respect to one another in such a way that the main extension direction $h_E$ of the receiving device 18 is arranged perpendicularly to the main extension direction $h_S$ of the transmitting device 14. Moreover, the crossover point 22 of the receiving device 18 is arranged centrally with respect to the transmitting coil 24 of the transmitting device. If electric current $I_S$ flows through the transmitting coil 24, the transmission signal 16 is formed in the form of a magnetic field. As a result of the arrangement of the transmitting coil 24 with respect to the two receiving coils 20, the magnetic field is coupled into both receiving coils in identical portions. By virtue of the fact that the conductor loop which forms the receiving coils 20 is twisted at the crossover point 22, induced voltages in each case form in the two receiving coils as partial reception signals, which voltages mutually cancel one another out.

Consequently, the reception signal $U_E$ which substantially has the value zero or is below a predefined threshold value can be tapped off at an external voltage tap.

Figure 5:
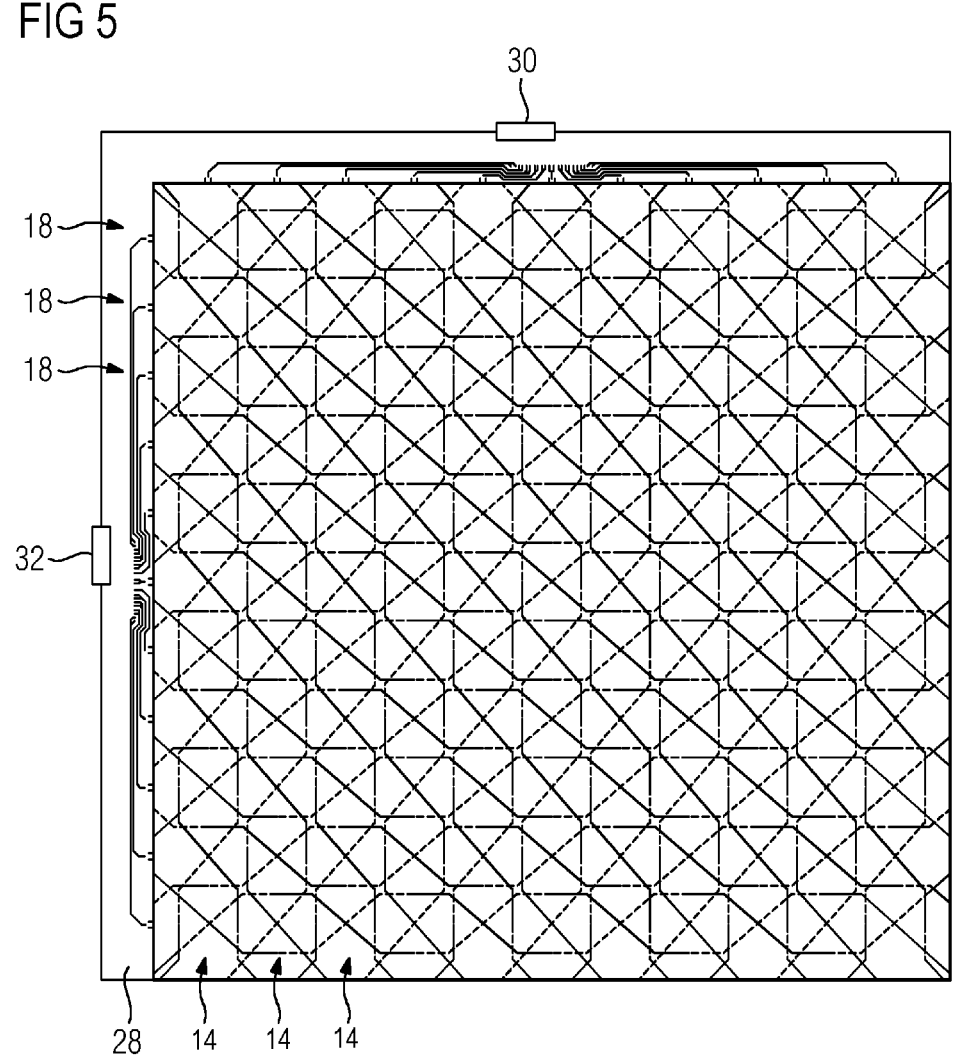
FIG. 5 shows a schematic illustration of an array comprising eleven transmitting devices and eleven receiving devices.

FIG. 5 shows a schematic illustration of an array comprising eleven transmitting devices 14 and eleven receiving devices 18 in the present exemplary embodiment. Such an array offers a significantly greater number of alternately decoupled coils which allow size information for the body 12 or the disturbance object additionally to be derived. In this case, the respective receiving devices 18 and transmitting devices 14 are formed analogously to one another.

The transmitting devices 14 and the receiving devices 18 in this case are arranged with respect to one another such that a plurality of transmitting-receiving pairs are formed. In this case, each transmitting-receiving pair always consists of a loop antenna and a butterfly antenna which lie geometrically one above another such that they are magnetically decoupled.

In the present exemplary embodiment, the respective transmitting devices 14 and the receiving devices 18 are applied to a carrier element 28 by a corresponding lithography method. In the present case, the solid lines represent conductor tracks situated on the top side of the carrier element 28. The dashed lines represent conductor tracks situated on the underside of the carrier element 28. The carrier element 28 can be a circuit board, in particular.

The transmitting devices 14 are arranged with respect to the receiving devices 18 such that the respective main extension directions $h_S$ of the transmitting devices 14 are arranged perpendicularly to the respective main extension directions $h_E$ of the receiving devices 18. In other words, vertical and horizontal elongate coils are involved, which are twisted respectively five times and six times in the example of the 11×11 arrangement shown here. As a result of the suitable superimposition, the geometry alone has the consequence that each horizontal receiving device 18 is decoupled at all eleven vertical transmitting devices 14 and also each vertical transmitting coil 14 is decoupled from all eleven horizontal receiving devices 18.

Furthermore, a control device 30 is provided, by which the individual transmitting devices 14 can be correspondingly driven. In particular, the transmission current $I_S$ can be applied to the transmitting devices. Moreover, a measuring device 32 is provided, which is designed to receive the reception signals $U_E$ of the individual receiving devices 18 and, if appropriate, to evaluate them accordingly.

If the transmission current $I_S$ is then applied sequentially to each of the transmitting devices 14 and if the eleven induced reception signals $U_E$ of the receiving devices 18 are in each case read out, then 121 different measurement signals are obtained in this example. A further advantage of this arrangement is that drifting of transmitting and receiving electronics can in each case affect entire row and column results and can thus be eliminated in an automatic calibration. At the end regions of the twisted conductor strip structures which in each case form the transmitting devices 14 and the receiving devices 18, an inhomogeneity necessarily occurs, which can result in a reduced decoupling between transmitting device 14 and receiving device 18. This can be avoided by means of the conductor track routing being changed suitably in this region or by the introduction of discrete components.

Any further number and arrangement of transmitting devices 14 and receiving devices 18 is also possible instead of the arrangement shown in FIG. 5. The odd number of transmitting devices 14 and receiving devices 18 affords the advantage that an arrangement with two-fold axial symmetry arises which can be arranged better in relation to a primary coil and/or a secondary coil of a charging arrangement for an electric vehicle.

The array structure shown in FIG. 5, compared with conventional metal detectors, enables a simple spatial resolution and hence a differentiation, in particular between a vehicle underbody and an actually present electrically conductive body 12 or a disturbance object. As a result of the alternate decoupling of the transmitting device 14 and the receiving devices 18, a sufficient sensitivity and thus utilizable measurement signals can be provided. The arrangement in rows and columns additionally affords the possibility of preventing the drifting of the transmitting and receiving electronics during operation by means of corresponding calibration. Furthermore, the advantage is afforded that the carrier element 28 or the circuit board can be contacted only at the edges. Possibly disturbing wiring within the circuit board can thus be dispensed with.

The invention claimed is:

1. A charging arrangement for inductively charging an electric vehicle, comprising:
    an apparatus for checking for a presence of an electrically conductive body, the apparatus including:
        a plurality of transmitting devices, at least one transmitting device of said plurality for generating a transmission signal in the form of a magnetic field;
        a plurality of receiving devices, at least one receiving device of said plurality for generating a reception signal from the transmission signal induced into said receiving device;
        wherein said plurality of transmitting devices are an odd number of transmitting devices and said plurality of receiving devices are an odd number of receiving devices a control device configured to sequentially drive said transmitting devices for respectively providing the transmission signal;
    said transmitting devices arranged relative to said receiving devices with a main extension direction perpendicular to a main extension direction of said receiving devices;
    said transmitting device and said receiving device configured such that, when the electrically conductive body is present, a first reception signal is formed in said reception device on account of the induced transmission signal and, when the electrically conductive body is absent, a second reception signal is formed that is different from the first reception signal; and
    said transmitting device includes a predetermined number of transmitting coils arranged alongside one another in a main extension direction of said transmitting device and said receiving device has a plurality of receiving coils and a crossover point between two receiving coils arranged alongside one another, and said receiving device is arranged with respect to said transmitting device to center said crossover point within one of said transmitting coils.

2. The charging arrangement according to claim 1, wherein said transmitting device and said receiving device are configured to cause, when the electrically conductive body is absent, partial reception signals to form in said receiving device on account of the induced transmission signal, and wherein the partial reception signals substantially cancel one another out in the reception signal.

3. The charging arrangement according to claim 1, wherein said receiving device comprises a predetermined number of receiving coils arranged with respect to said transmitting device for inducing the transmission signal into the respective said receiving coils substantially in identical portions.

4. The charging arrangement according to claim 3, wherein said receiving coils are arranged alongside one another in a main extension direction of said receiving device.

5. The charging arrangement according to claim 1, wherein said transmitting device is configured with respectively adjacent said transmitting coils to provide oppositely directed magnetic fields.

6. The charging arrangement according to claim 1, wherein each said transmitting device and said receiving device is a conductor loop twisted at least once.

7. The charging arrangement according to claim 1, wherein said transmitting coils and said receiving coils are photolithographic elements applied to a carrier by photolithography.

8. The charging arrangement according to claim 7, wherein each of said transmitting coils and said receiving coils has partial regions arranged on a top side of said carrier and partial regions arranged on an underside of said carrier.

\* \* \* \* \*